(No Model.) 3 Sheets—Sheet 1.
C. H. FRINGS.
APPARATUS FOR IMPREGNATING LIQUIDS WITH CARBONIC ACID.
No. 486,225. Patented Nov. 15, 1892.
Fig. 1.
Fig. 2.
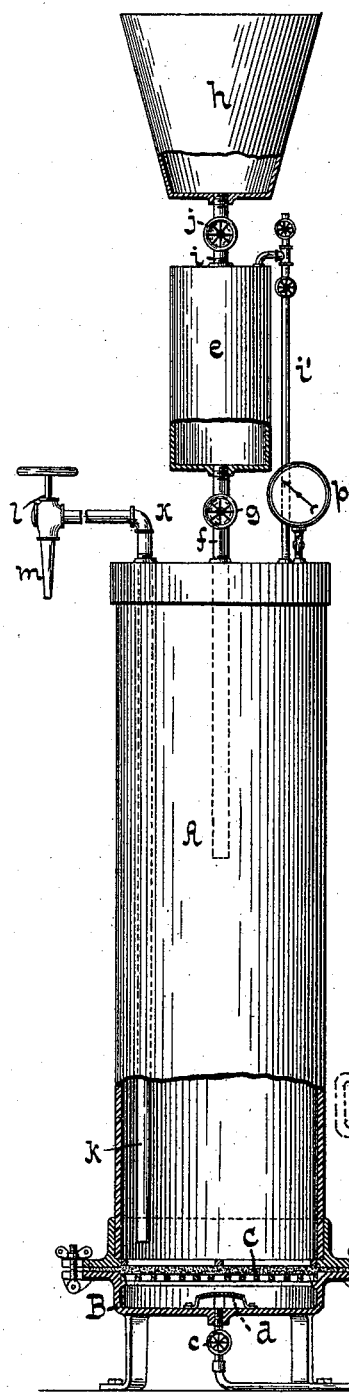
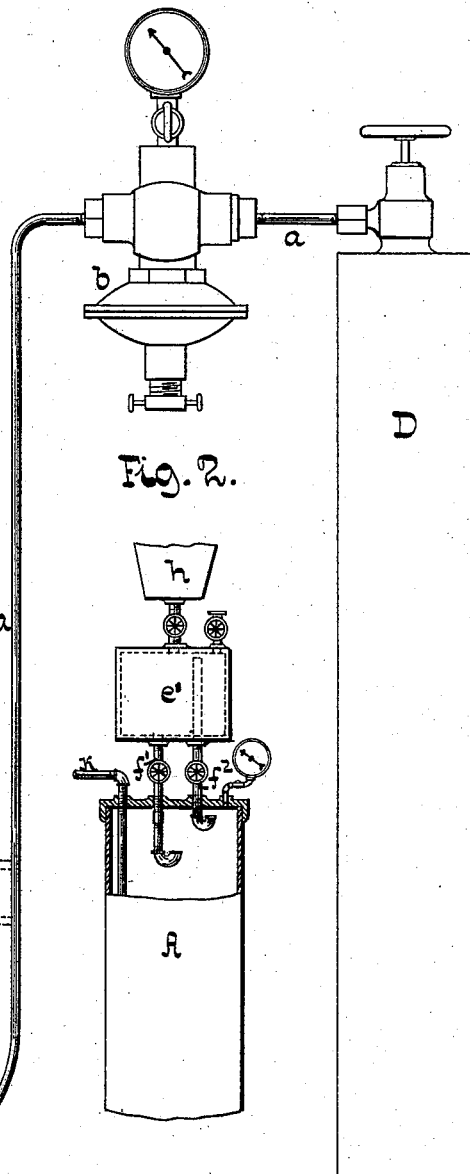
WITNESSES:
Benj. W. Tucker Jr.
A. Faber du Faur
INVENTOR:
Charles H. Frings
BY A. Faber du Faur Jr.
ATTORNEY.

(No Model.) 3 Sheets—Sheet 2.
C. H. FRINGS.
APPARATUS FOR IMPREGNATING LIQUIDS WITH CARBONIC ACID.
No. 486,225. Patented Nov. 15, 1892.
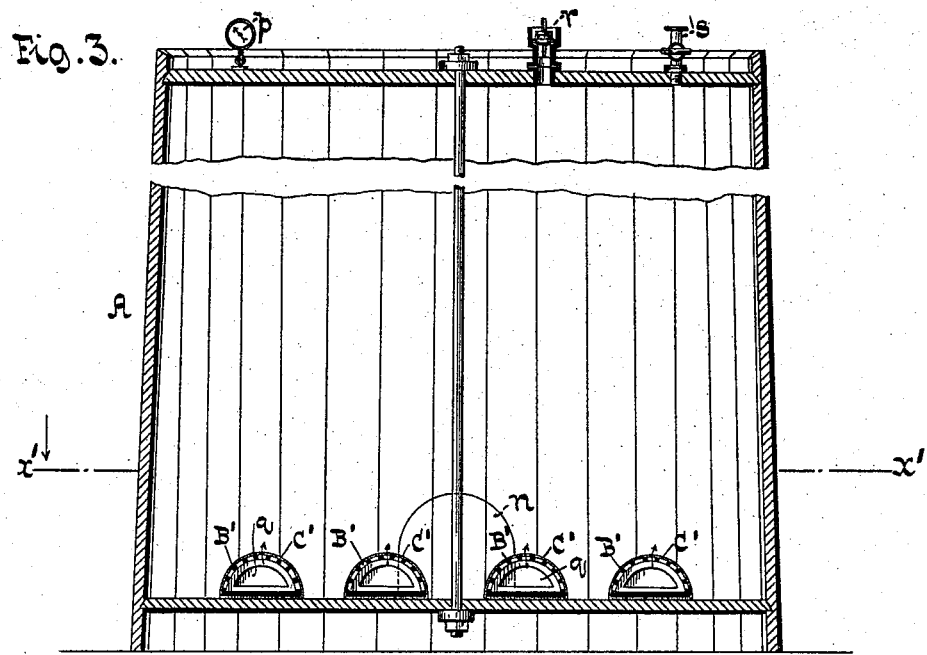
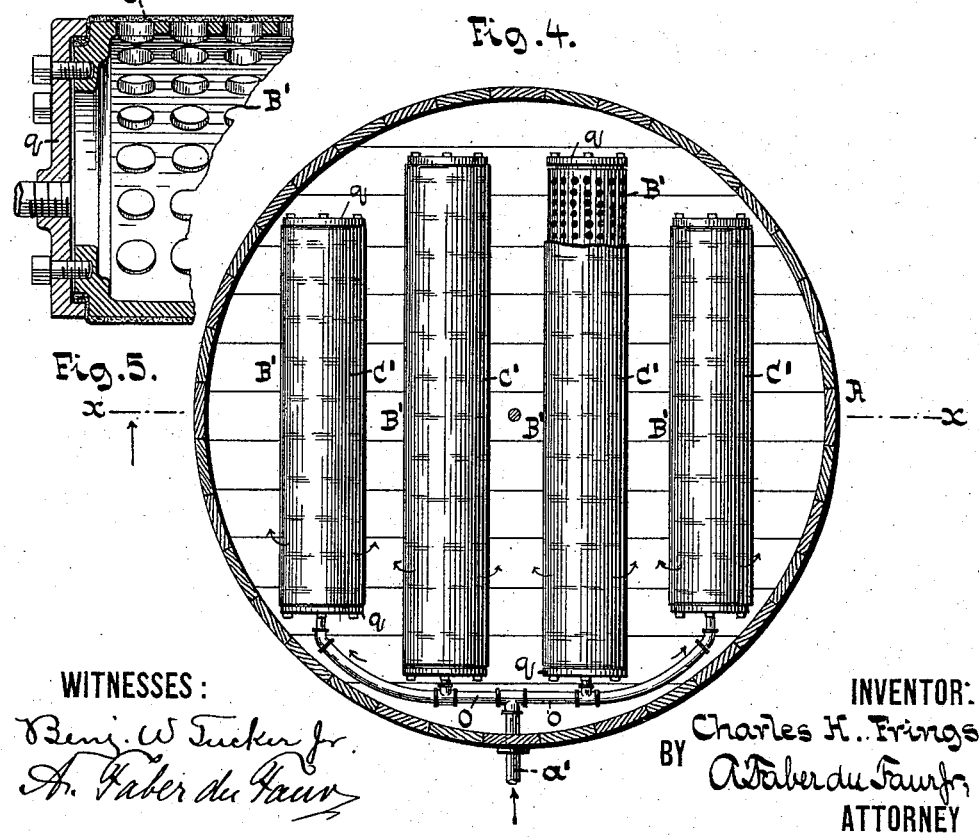
WITNESSES: 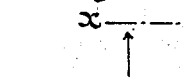
INVENTOR:
Charles H. Frings,
BY A. Faber du Faur Jr.
ATTORNEY (No Model.) 3 Sheets—Sheet 3.

C. H. FRINGS.
APPARATUS FOR IMPREGNATING LIQUIDS WITH CARBONIC ACID.

No. 486,225. Patented Nov. 15, 1892.

WITNESSES:
Benj. W. Tucker Jr.
A. Faber du Faur

INVENTOR:
Charles H. Frings,
BY A. Faber du Faur Jr.
ATTORNEY

UNITED STATES PATENT OFFICE.

CHARLES H. FRINGS, OF NEW YORK, N. Y., ASSIGNOR TO THE BREWING IMPROVEMENT COMPANY, OF MAYWOOD, NEW JERSEY.

APPARATUS FOR IMPREGNATING LIQUIDS WITH CARBONIC ACID.

SPECIFICATION forming part of Letters Patent No. 486,225, dated November 15, 1892.

Application filed October 12, 1891. Serial No. 408,470. (No model.)

*To all whom it may concern:*

Be it known that I, CHARLES H. FRINGS, a citizen of the United States, and a resident of New York, in the county and State of New York, have invented certain new and useful Improvements in Apparatus for Impregnating Liquids with Carbonic Acid, of which the following is a specification.

My invention relates to improvements in apparatus for impregnating liquids with carbonic acid, and in particular to the preparation of fermented malt liquors for the market without the addition of young beer (kraeusen) and without a new fermentation.

Various apparatuses have heretofore been used for impregnating liquids with carbonic acid by agitation, whereas the object of my invention is to obtain a thorough impregnation as gradually and quietly as possible, substantially in the manner in which carbonic-acid gas rises in a fermenting liquid and is absorbed by the same. For this purpose I place the liquid to be impregnated into a closed receptacle and introduce carbonic-acid gas at or near the bottom in a state of very fine division by causing it to pass through a body sufficiently porous to allow it to pass through under pressure, such as close textured or felted fabric, unglazed earthenware, asbestus, sandstone, wood, and other bodies which are pervious to gas, but offer considerable resistance to the passage of liquid.

I have shown several forms of my apparatus in the annexed drawings, in which—

Figure 6:
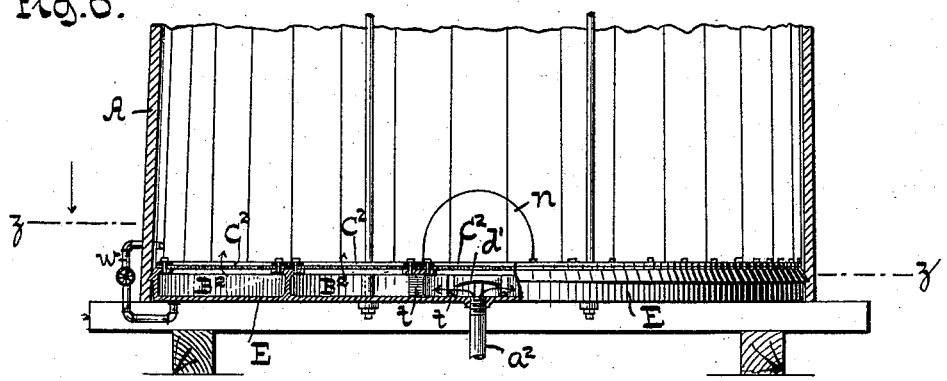
Figure 7:
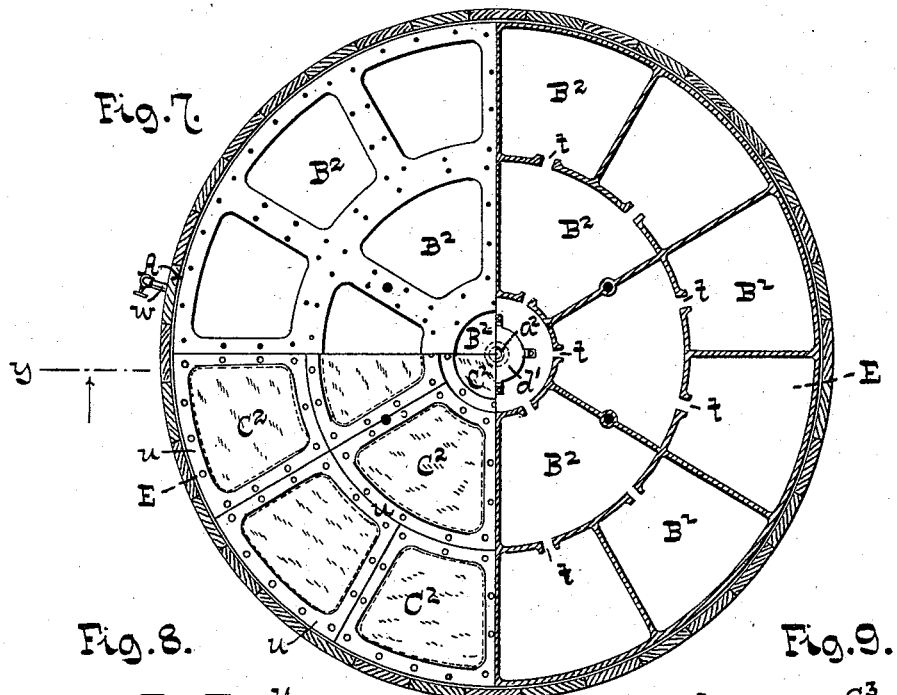
Figure 8:
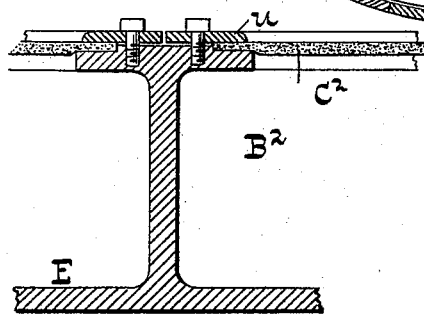
Figure 9:
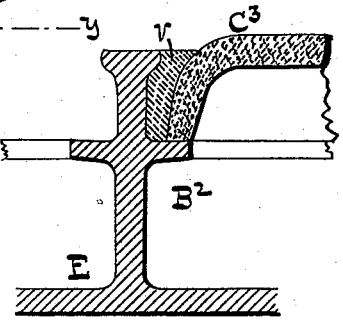

Figure 1 is an elevation, partly in section, of a complete apparatus. Fig. 2 is a modification of the same. Fig. 3 is a vertical section in the plane $x\ x$, Fig. 4, of a closed vat with removable means for introducing carbonic acid. Fig. 4 is a horizontal section in the plane $x'\ x'$, Fig. 3. Fig. 5 is an enlarged detail view. Fig. 6 is a vertical section in the plane $y\ y$, Fig. 7, of a vat with bottom permanently fixed for the admission of carbonic acid. Fig. 7 is a horizontal section in the plane $z\ z$, Fig. 6. Figs. 8 and 9 are detail sections.

Referring now to Fig. 1, A represents a closed receptacle for the liquid to be impregnated; B, a receptacle for carbonic-acid gas under pressure, located at the bottom of the receptacle A, the two receptacles being separated by a diaphragm C, formed by a body pervious to gas under pressure. For this purpose I use, by preference, a very close textile fabric known to the trade as "mole-skin." It may, however, be formed of other suitable pervious material—such as asbestus cloth, unglazed earthenware, sandstone, wood with the fibers running at right angles to the diaphragm, &c.—as distinguished from open or perforated materials—such as wire-gauze, &c.—which pass the liquid through freely, while the substances mentioned offer more or less resistance to the passage of the liquid and divide the current of carbonic-acid gas into minute particles, giving the liquid being impregnated when observed through a glass cylinder a dusty or misty appearance, while even small perforations will cause large bubbles to pass through.

D represents a cylinder containing liquid carbonic acid and which is the external source of supply for the receptacle B, which latter is connected to the outlet of the cylinder D by a pipe $a\ a$ with interposed reducing-valve $b$ and stop-cock $c$. A meter may also be placed between the reducing-valve and the receptacle B, as indicated in Fig. 1 in dotted lines.

Carbonic-acid cylinders are always provided with stop-valves, by the use of which, in connection with the reducing-valve, the pressure of the gas, respectively the supply, is under control.

$d$ is a deflecting-plate to properly distribute the current of carbonic acid beneath the diaphragm.

$p$ is a pressure-gage placed on top of the receptacle A; $e$, a closed vessel to contain liquid for replenishing the contents of the receptacle A through pipe $f$ with stop-cock $g$. A funnel $h$, communicating with the vessel $e$ by means of pipe $i$ and stop-cock $j$, serves for filling the vessel $e$. The top of the vessel $e$ is connected by a valved pipe $i'$ with the top of the receptacle A.

K is a pipe passing through the top of the receptacle A to near its bottom and serves for drawing off the liquid through stop-cock $l$ and spout $m$.

The liquid in the receptacle A may be automatically kept at a substantially-constant level by the arrangement shown in Fig. 2, where the vessel $e'$ is connected with the receptacle A by a pipe $f'$ extending from the bottom of $e'$ some distance into A and by a pipe $f^2$ extending from near the top of the vessel $e'$ to a point within A above the lower end of the pipe $f'$.

The apparatus illustrated in Figs. 1 and 2 is particularly applicable for preparing and dispensing carbonic-acid water and other effervescent beverages, and the receptacles A and B should for this purpose be placed within a cold chamber. The supply of carbonic-acid gas is under perfect control, and whenever the pressure on the top of the receptacle A reaches a certain limit the reducing-valve closes off the supply, which is reestablished when part of the liquid is drawn off or carbonic acid is allowed to escape.

In Figs. 3, 4, and 5 I have shown an example of applying my invention to a closed beer-vat. In these figures, A represents the closed vat or receptacle for the liquid to be impregnated, provided with the usual manhole $n$; B' B' B' B', a series of receptacles for carbonic-acid gas, located at the bottom of the vat and so constructed that they may be inserted and removed through the manhole $n$. The several receptacles B' are connected by a branch pipe $o$, which from an outside source receives a supply of carbonic-acid gas under pressure through a pipe $a'$, the supply being controlled in the usual manner and when desired measured by a meter.

As shown in the drawings, the receptacles B' are ⌂-shaped hollow castings, the ends of which are closed by covers $q$. The bottoms of the receptacles B' are solid, while the arched tops are perforated. The receptacles B' are tightly covered by bodies C' of material pervious to gas—such as mole-skin, asbestus cloth, or other suitable material—so that the carbonic-acid gas passing through is discharged near the bottom of the vat in a finely-divided condition.

$p'$ is a pressure-gage on the top of the vat A, $r$ a safety-valve, and $s$ a pipe with stop-cock for connecting a hose for filling the vat or for supplying compressed air or carbonic acid when discharging the contents of the vat. Receptacles for carbonic acid, constructed substantially like the receptacles B', may be inserted into large ordinary casks through the manhole. Carbonic-acid gas under pressure may be supplied from a battery of cylinders containing liquid carbonic acid or from any other source by means of a pump or from a gasometer. Carbonic acid generated by the fermentation of beer may be collected and supplied under pressure, the supply being regulated in the usual manner and when desired measured by a meter.

In Figs. 6, 7, 8, and 9 I have shown another example of applying my invention to large closed vats. In these figures, A represents part of the vat or receptacle for the liquid to be impregnated, the bottom E of the vat being a casting forming a series of receptacles $B^2$ $B^2$ for carbonic acid, all communicating through passages $t$, so as to practically form one receptacle or compartment, which receives a supply of carbonic-acid gas from any suitable external source through a pipe $a^2$ entering the central receptacle, the current being deflected by a disk $d'$. The receptacles or cells $B^2$ $B^2$ are closed at the top by pervious bodies $C^2$—such as moleskin—fastened down by frames $u$, as shown on a larger scale in Fig. 8, or by covers $C^3$ of burnt clay inserted in the manner shown in Fig. 9, where $v$ indicates a cement joint. In this arrangement, as in the others shown and described, the carbonic-acid gas passes from the receptacle $B^2$, located at the bottom of the liquid-receptacle A into the latter through bodies $C^2$ or $C^3$, which are pervious to the gas. Drain-pipes may be provided at the bottom of the receptacle for carbonic acid to draw off any liquid which may ooze through the porous bodies, and such drain-pipes—like the pipe $w$ in Figs. 6 and 7—may return the liquid to the upper receptacle, since the resistance to the passage of carbonic acid through the porous bodies creates a difference of pressure between the two sides of the diaphragms. In saturating liquids with carbonic acid the apparatus should be kept at a sufficiently-low temperature—generally about 40°.

The arrangement in Figs. 3 to 9 are particularly applicable to the preparations of beer for the market without adding kraeusen and without a new fermentation.

My invention is not limited to any particular details of construction or mode of application.

What I claim as my invention, and desire to secure by Letters Patent, is—

1. In an apparatus for impregnating liquids with carbonic acid, a closed vessel for containing the liquid to be impregnated, a receptacle or receptacles for carbonic acid, located at and extending substantially over the bottom of said vessel, porous material such as specified and as distinguished from open or perforated material separating the carbonic-acid receptacle or receptacles from the superposed liquid, and an external source of supply of carbonic acid under pressure connected with the said receptacle or receptacles, substantially as shown and described.

2. In an apparatus for impregnating liquids with carbonic acid, a closed vessel divided by a diaphragm into an upper compartment to contain the liquid to be impregnated and a lower compartment for carbonic acid, said diaphragm consisting of porous material such as specified and as distinguished from open or perforated material, and an external source of supply of carbonic acid under pressure connected with the lower compartment, substantially as shown and described.

In testimony that I claim the foregoing as my invention I have signed my name, in presence of two witnesses, this 6th day of October, 1891.

CHARLES H. FRINGS.

Witnesses:
A. FABER DU FAUR,
CHAS. SIMPSON.